(Model.)
P. SMITH.
SUCKER ROD ELEVATOR.
No. 263,820. Patented Sept. 5, 1882.
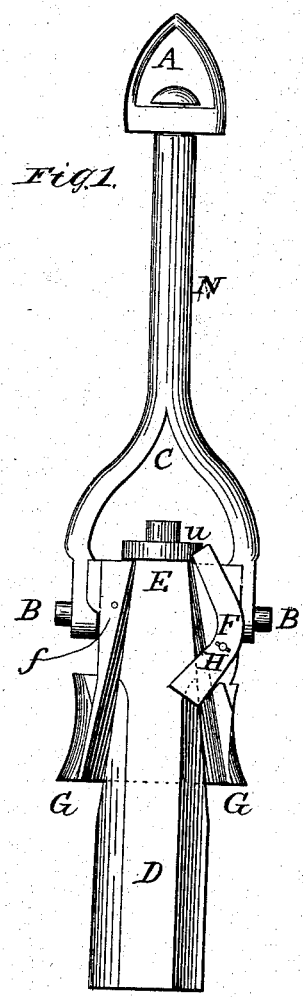
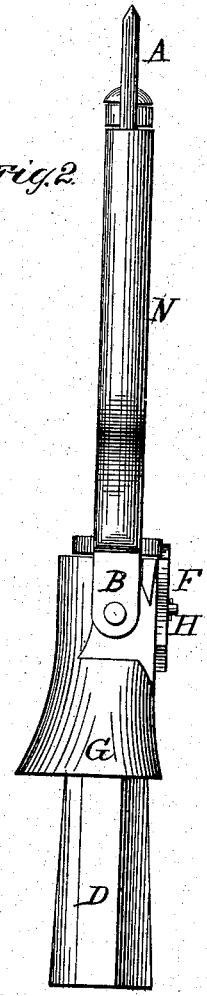
Witnesses.
H. M. Richmond
C. W. Hamersly
Inventor.
Parker Smith by his atty
A. B. Richmond

UNITED STATES PATENT OFFICE.

PARKER SMITH, OF GOODELL, PENNSYLVANIA.

SUCKER-ROD ELEVATOR.

SPECIFICATION forming part of Letters Patent No. 263,820, dated September 5, 1882.

Application filed March 27, 1882. (Model.)

*To all whom it may concern:*

Be it known that I, PARKER SMITH, a citizen of the United States, residing at Goodell, McKean county, Pennsylvania, have invented a new and Improved Sucker-Rod Elevator, of which the following is a specification.

My invention relates to sucker-rod elevators; and it consists of parts, that will hereinafter be described.

Figure 1 is a front view of my device. D represents the sucker-rod, with the iron screw-connection at E constructed in the usual form. G G is a head or socket, of iron or other suitable material, with a tapering opening therein running through the same from the bottom to the top. This opening is the shape of the end or connection of the sucker-rod, and the side of this head or socket is cut away so that the end of the sucker-rod can be placed therein, as shown in the drawings, the flange of the connection M resting on the upper end of the head or socket G G. F is a "dog," shaped nearly like a letter L. This dog is hung on a bolt at H, which securely attaches it to the face of the head or socket G G, and it may be turned so that the rod D can be put in place, then turned down upon pin *f*, so that it will keep the sucker-rod in the socket. A is a swivel on the end of an iron stem, N. This stem forks at G into a "bail," which is attached to the head or socket by two strong pins, B B, so that it can easily be turned back or forward to be out of the way when the rod is placed in position as one joint after another of the sucker-rod is drawn from the well. The elevator can be removed and attached with facility.

Fig. 2 represents a side view of my device, showing the outside of the socket G, the dog F, attached to the face or side of the socket G by the pin H, the bail attached to the socket by one of the pins B, the stem N, swivel A, and the sucker-rod D in place.

I am aware that sucker-rod elevators have been made with a sleeve which is adapted to slide upon the shank, but that device differs from mine in that it is necessary to hold the sleeve up by hand while the rod is placed in or removed from the socket, whereas my dog is so pivoted that it will remain open without handling. I am also aware that dogs have been so pivoted to the side of the socket that they move horizontally from the longitudinal or vertical slot thereof. These devices are defective for the reason that a sudden jerk upon or slackening of the cable is liable to unhook the dog and allow the rod to fall out. This is obviated in my device by pivoting the dog at one side of the longitudinal or vertical slot in such a manner that its motion will be in a vertically-curved line.

My device also presents another advantage—viz., having the lower end of the dog of such a length that when the upper end rests upon pin *f* it will extend beyond the side of the elevator and serve as a handle for bringing the dog to a vertical position. Therefore

What I claim as new is—

1. In a sucker-rod elevator, a dog for holding the rod in place and pivoted to move in a vertically-curved line over the longitudinal opening of the socket or be swung clear thereof, for the purpose set forth.

2. In a sucker-rod elevator, a dog for holding the rod in place, pivoted to move in a vertically-curved line across the longitudinal opening of the socket or be swung clear thereof, and having a handle for operating the same.

PARKER SMITH.

Witnesses:
 H. E. HAZZARD,
 B. F. DARLING.